(12) United States Patent
Boccadoro et al.

(10) Patent No.: US 8,093,528 B2
(45) Date of Patent: Jan. 10, 2012

(54) METHOD AND DEVICE FOR ELECTRICAL DISCHARGE MACHINING

(75) Inventors: Marco Boccadoro, Verscio (CH); Stefano Bonini, Brissago (CH)

(73) Assignee: Agie Charmilles SA, Losone (CH)

( * ) Notice: Subject to any disclaimer, the term of this patent is extended or adjusted under 35 U.S.C. 154(b) by 1078 days.

(21) Appl. No.: 11/982,776

(22) Filed: Nov. 5, 2007

(65) Prior Publication Data

US 2008/0116174 A1 May 22, 2008

(30) Foreign Application Priority Data

Nov. 6, 2006 (EP) .................................... 06023034

(51) Int. Cl.
B23H 1/02 (2006.01)
B23H 7/14 (2006.01)

(52) U.S. Cl. ................ 219/69.17; 219/69.13; 219/69.18

(58) Field of Classification Search ............... 219/69.13, 219/69.17, 69.18
See application file for complete search history.

(56) References Cited

U.S. PATENT DOCUMENTS

| | | | | | |
|---|---|---|---|---|---|
| 3,988,560 | A | * | 10/1976 | Losey et al. | 219/69.13 |
| 3,997,753 | A | * | 12/1976 | Inoue | 219/69.13 |
| 4,021,635 | A | * | 5/1977 | Losey et al. | 219/69.16 |
| 4,376,880 | A | * | 3/1983 | Inoue | 219/69.17 |
| 4,504,722 | A | * | 3/1985 | Kishi et al. | 219/69.13 |
| 4,806,719 | A | * | 2/1989 | Seerieder et al. | 219/69.13 |
| 4,858,140 | A | | 8/1989 | Buhler et al. | |
| 4,903,213 | A | | 2/1990 | Buhler et al. | |
| 5,352,859 | A | * | 10/1994 | Kaneko et al. | 219/69.13 |
| 5,428,201 | A | * | 6/1995 | Kaneko et al. | 219/69.16 |
| 5,496,984 | A | * | 3/1996 | Goto et al. | 219/69.13 |

FOREIGN PATENT DOCUMENTS

| | | | |
|---|---|---|---|
| CH | 650 433 | | 7/1985 |
| DE | 3644952 | A1 | 6/1988 |
| EP | 1537934 | A2 | 6/2005 |
| JP | 60-150910 | A * | 8/1985 |
| JP | 63-200918 | A * | 8/1988 |
| JP | 2-212023 | | 8/1990 |
| JP | 7-1236 | A * | 1/1995 |
| JP | 2000-153409 | A * | 6/2000 |
| SI | 20253 | A | 12/2000 |

OTHER PUBLICATIONS

Machine translation of Japan Patent No. 7-1,236, May 2011.*
Arc Detection in Electro-Discharge Machining, Sponsored by the Deutsche Forschungsgemeinschaft (DFG), Prof. Dr.-Ing. A. Behrens, Dipl. Inform. J. Ginzel, Dipl. Ing F.-L. Bruhns, Universitat der Bundeswehr hamburg, p. 1-16.

* cited by examiner

Primary Examiner — Geoffrey S Evans
(74) Attorney, Agent, or Firm — Harness, Dickey & Pierce, P.L.C.

(57) ABSTRACT

A method for electrical discharge machining a workpiece includes dividing machining time into a sensing interval during which reference values are captured from machining pulses and into a machining interval during which no reference values are captured. The sensing interval includes either a first sensing interval after implementation of a jump motion of the electrode in the working gap or a second sensing interval after application of an extended pause time to at least some of the machining pulses. The extended pause time is longer than a pause time of other ones of the machining pulses. The method also includes sensing an electrical parameter of a current machining pulse and deriving at least one characteristic value from the sensed electrical parameter. The method further includes comparing characteristic value to at least one of the captured reference values and initiating an action depending on a result of the comparison.

13 Claims, 6 Drawing Sheets

METHOD AND DEVICE FOR ELECTRICAL DISCHARGE MACHINING

Figure 1:
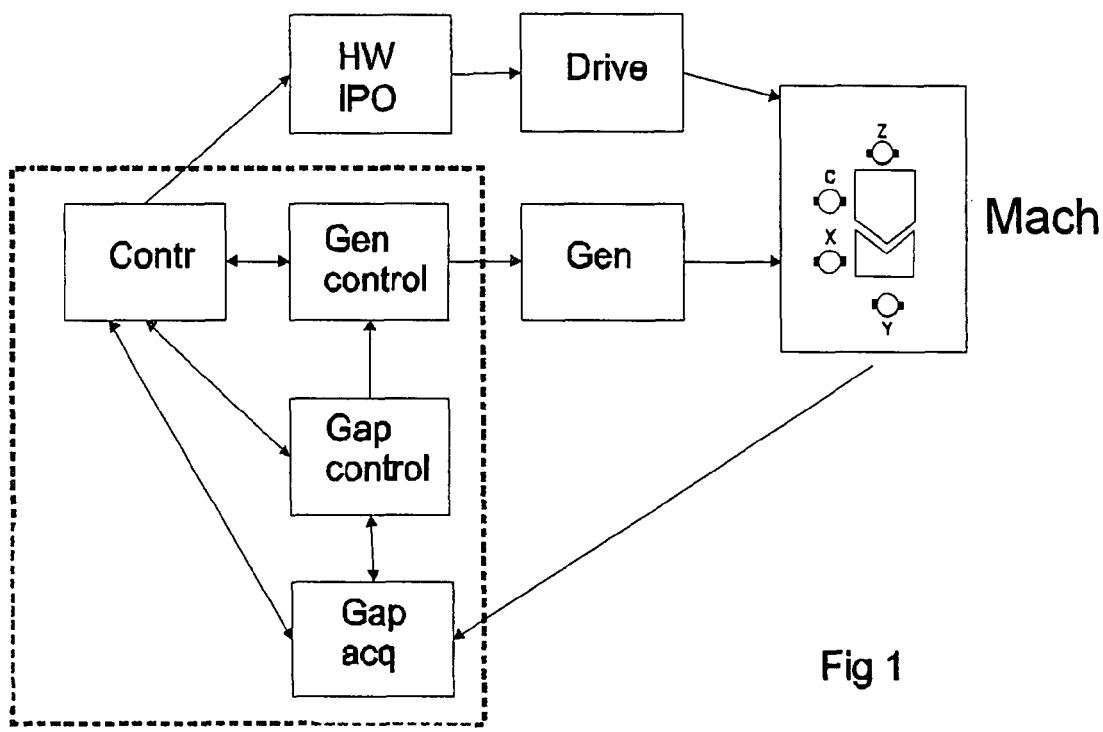

The invention relates to a method and device for electrical discharge machining (EDM), and particularly to a method and device for generating machining pulses for such EDM to enhance the productivity of EDM systems.

In EDM a train of machining pulses is applied to the working gap between workpiece and electrode. To monitor the process the voltage and current profile across the working gap with time is sensed. From the pulse voltage profile of the machining pulse applied to the working gap at the time characteristic values are derived, such as ignition voltage, burning voltage, ignition delay time, fall time of the ignition voltage to the burning voltage, high-frequency component of the burning voltage, etc. These derived values are compared to corresponding reference values to expose any degeneration in the process. Depending on the result thereof, actions are prompted, such as interrupting the current machining pulse, implementing a jump motion, increasing pause time between the machining pulses, etc. to suppress such process degenerations.

It is particularly the increasing use of graphite electrodes permitting speeding up the process whilst reducing the machining costs, but, on the one hand, comprising a higher arc susceptibility that demands monitoring the process to obtain absolute assurance of no process degeneration without having to sacrifice neither the machining speed nor the electrode wear.

The problem in the procedure as described above lies in establishing the reference values, it not being possible to define threshold values as generally applicable since the wealth of applications and the range of the currents and voltages of the machining pulses as put to use, are so large that the sensing errors alone require a variation of the reference values. Since it is namely impossible to sense the pulse voltage precisely in the working gap, the errors in sensing the pulse voltage add up, resulting in voltage sensing being falsified. Thus, for example, the voltage drop due to the impedance of a ribbed electrode, 40 mm long for a discharge current of 40 A is approximately 3 to 4 V, sensing the pulse voltage reliably requiring a resolution of at least 1 V. The reference values are a function of the machining priorities, material pairing, generator setting parameters, etc. Moreover, the variation in the machining conditions in the course of machining requires changes to the reference values due to variations in the micro- and macroscopic geometry and the flushing conditions. This is why it is difficult to attain good results with fixed predetermined reference values applicable for the complete duration of the machining.

From the generic SI 20253 A it is known to adapt the reference values at each machining pulse throughout entire machining time. The drawback here, however, is that as the machining conditions in the working gap deteriorate also the reference values tend to deteriorate so that in the end degeneration in the process cannot be reliably detected.

The invention is based on the object of detecting process degenerations in EDM more reliably.

The invention achieves this object with the subject matter of the independent claims 1 and 10. Preferred embodiments are described in the sub-claims.

Thus it is of advantage in the generic method and generic device that the reference values are now derived only from "ideal" machining pulses. Such pulses exhibit best results as to erosion, wear and process safety. Such ideal machining pulses occur in all probability after a jump motion, since an optimum conductivity of the working gap favors the process, but also after a longer pause time between two machining pulses. In other words, the invention involves sensing the reference values only during sensing intervals in which such "ideal" machining pulses occur more often such as after a jump motion and/or extended pause times.

Figure 2A:
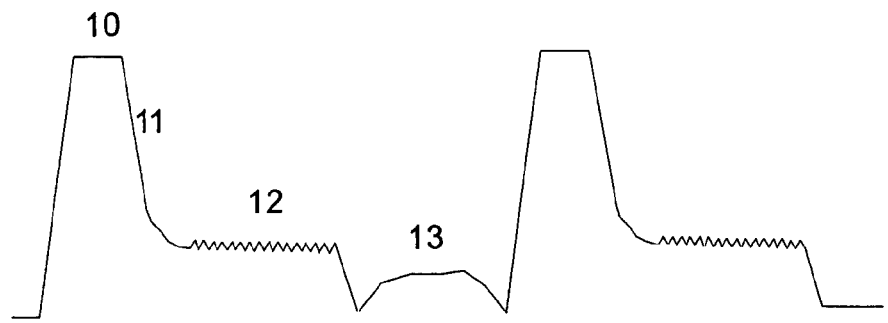
Figure 2B:
Figure 2C:
Figure 2D:
Figure 2E:
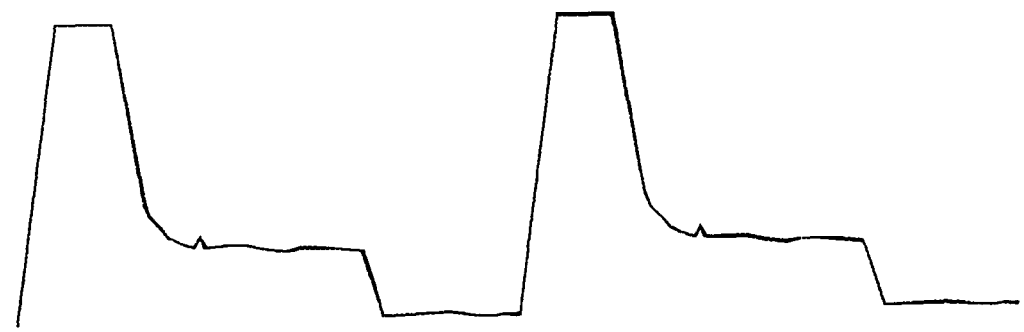
Figure 2F:
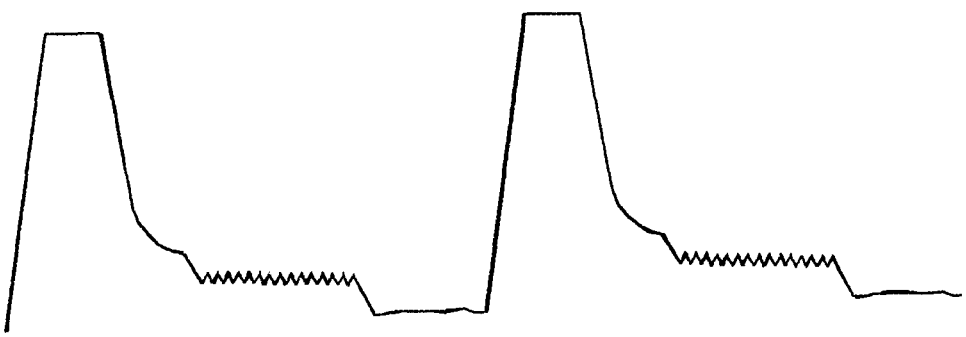
Figure 3:
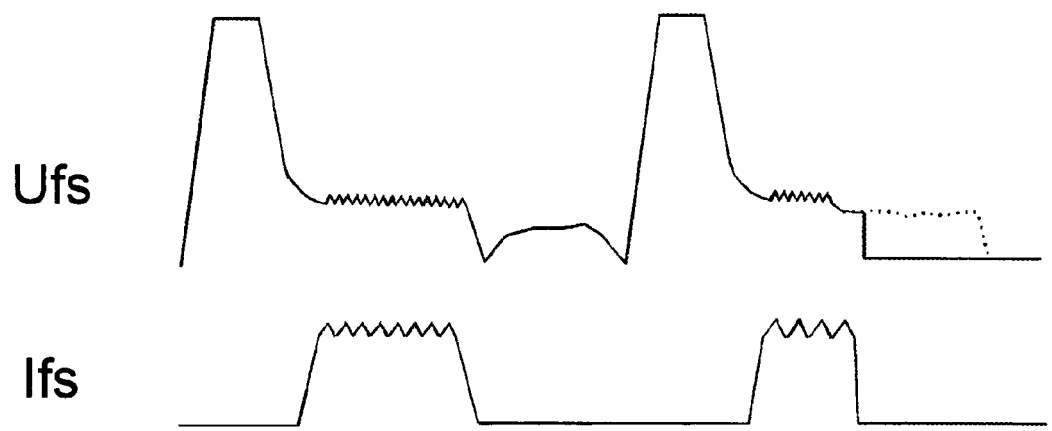
Figure 4:
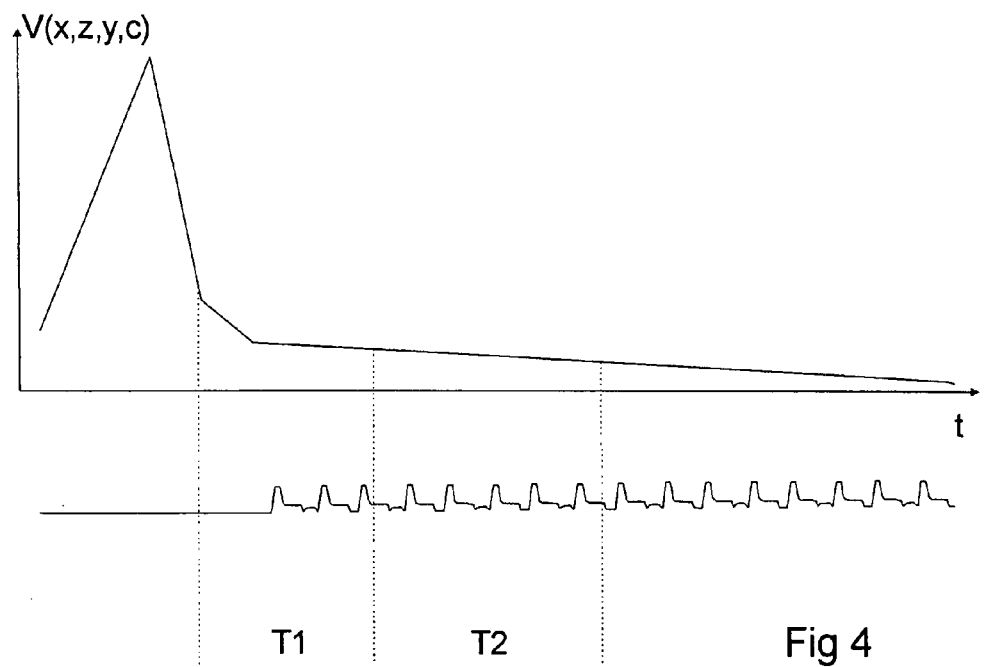
Figure 5:
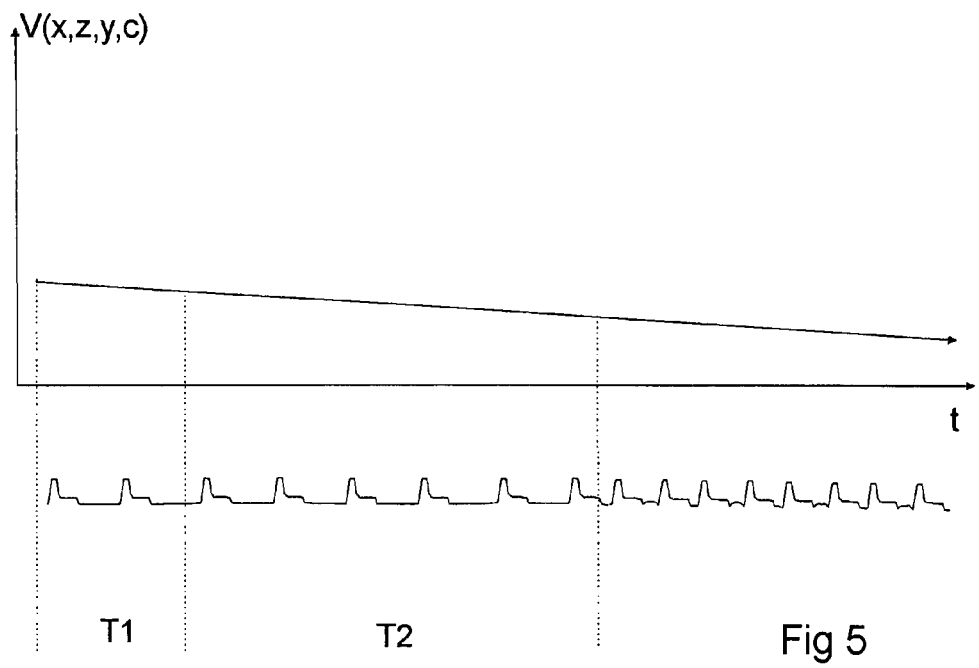
Figure 6:
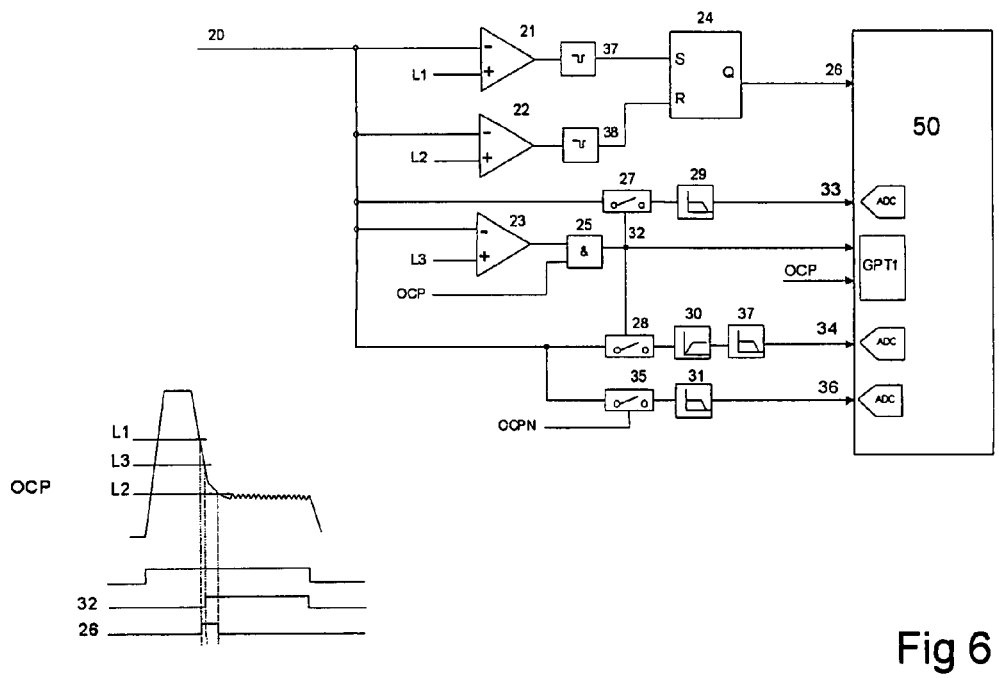
Figure 7:
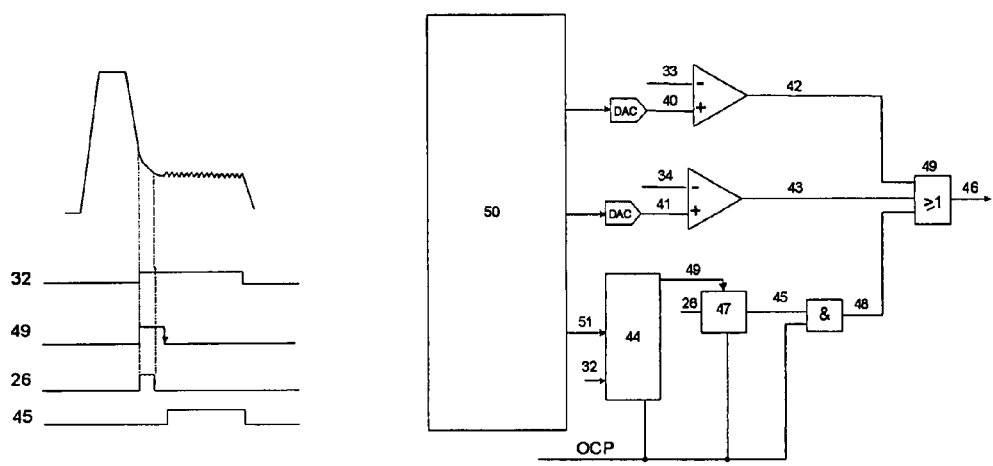

Preferred embodiments of the invention will now be detailed with reference to the attached drawings, in which FIG. 1 is a block diagram of a known die sinking electric discharge machine, FIGS. 2a-f is a plot of a typical machining pulse and of a few examples of degenerated machining pulses, FIG. 3 is a plot of masking the pulse, FIG. 4 is a plot of a first sensing interval T2 after a jump motion, FIG. 5 is a plot of a second sensing interval T2 following application of a machining pulse with an extended pause time, FIG. 6 is a block diagram of a preferred pulse discriminator circuit for capturing and saving the characteristic values from the machining pulses, and FIG. 7 is a preferred comparator/masking circuit.

DESCRIPTION OF PREFERRED EMBODIMENTS OF THE INVENTION

Referring now to FIG. 1 there is illustrated a block diagram showing the layout of a die sinking electric discharge machine in accordance with the present invention. The die sinking electric discharge machine comprises one or more drive modules (Drive), a numerical control (HW IPO) and a machining pulse generator, the latter comprising a generator module (Gen), a controller (Contr.), a generator control module (Gen control), a gap control module (Gap control) and a gap sensing module (Gap acq). The remaining elements of the die sinking electric discharge machine, such as the mechanical components and dielectric assembly, etc are grouped together as a block (mach).

The controller (Contr.) may be an industrial PC and/or a microcontroller. The three modules may be implemented as field programmable gate arrays (FPGA) which alternatively may also be replaced by a single more complex FPGA. The numerical control is a highly dynamic interpolator, the concrete configuration of which is detailed in the patents DE 36 40 987 and DE 36 44 952, the disclosure of which is included in the present description by reference thereto. The setpoint value of the interpolator is supplied to the drives, usually for the purpose of controlling the X-, Y-, Z- and C-axes (further axes being possible).

The generator control (Gen control) generates the pulse trains which are converted by the generator (Gen) into current pulses. The gap control module (Gap Control) shown in more detail in FIG. 7 implements safety guards to eliminate or avoid process degenerations. The gap sensing module (Gap Acq) shown in more detail in FIG. 6 senses the gap voltage and the gap current. The microcontroller 50 handles a few functions of the gap sensing module, the gap control module, the generator control and the hardware interpolator. For a better understanding of the invention only the relevant circuits of the modules are shown in the Figures, i.e. less relevant circuits such as the scaling circuit of the pulse voltage, etc. are omitted.

The method and device in accordance with the invention relate to the sector shown by the broken-line in FIG. 1.

Referring now to FIG. 2a there is illustrated the voltage profile of an ideal erosion pulse as a function of time in a die sinking electric discharge machine with an anodic poled machining electrode, characterized by at the start of the pulse the idle voltage $U_i$ is attained and maintained during a minimum time (ignition delay time $t_d$) (10)

after ignition, the idle voltage $U_i$ softly falls to the burning voltage $U_e$ (11), the burning voltage $U_e$ (12) is not too low and comprises a high-frequency component, the fall time $t_{bd}$ of the burning voltage is not to steep (i.e. the burning voltage must not fall too quickly)

in the pause time the voltage $U_0$ (13) is not too low.

A machining pulse deviating from such an ideal pulse is a so-called degenerated pulse, thus indicating a process degeneration. To detect such deviating machining pulses characteristic values (criteria) of the machining pulse are examined. A variety of such criteria is known to effectively protect die-sinking electric discharge machining from process degenerations. In "Arc detection in Electro-Discharge Machining" Proceedings of the 13$^{th}$ ISEM, vol 1, page 125 to 140 BEHRENS explains the criteria as used most, as shown in FIGS. 2b-f:

the ignition delay time is too short (particularly with a discharges train thereof) (FIG. 2b)

the gradient of the pulse voltage in discharge is too steep, i.e. fall time $t_{bd}$ from the idle voltage $U_i$ to the burning voltage $U_e$ is too short (FIG. 2c).

the idle voltage $U_i$ is not attained (FIG. 2d), the high-frequency component of the burning voltage $U_e$ is missing (FIG. 2e) and the burning voltage $U_e$ is too low (FIG. 2f).

When from this criteria such degenerated pulses are detected, at least one of the following corrective action is preferably implemented:

the pulses involved are interrupted (see FIG. 3), a jump motion is triggered (see e.g. EP 0 252 239, the disclosure of which is included in the present application by reference thereto), the pause times between the machining pulses are increased (see e.g. EP 0 252 239).

The above list is not complete, for instance, a corrective action known from prior art is to adapt a servo setpoint value or to make other parameter adaptations, which can be likewise included in the scope of the invention as described presently.

Thus, if a sensed value fails to attain a reference value a corrective action is implemented. If one or more features of the pulse fail to correspond to those of the ideal pulse, actions are taken to maintain the process productivity high.

Such an action may involve masking a pulse as shown in FIG. 3. The example shows a machining pulse whose burning voltage $U_e$ is too low, the machining current $I_e$ then being discontinued as quickly as possible.

During machining it is of advantage to implement periodic jump motions of the machining electrode to remove the erosion debris from the working gap, requiring the machining electrode to be quickly removed from the workpiece by a set distance and then immediately moved back to the working gap. FIG. 4 shows the feed vector V(x, z, y, c) of the machining electrode as a function of the time for machining after a jump motion. The jump motion occurs at the start of the feed profile as shown in FIG. 4 during the time duration of steep segments of the feed motion. FIG. 4 shows in a lower portion a train of discharge pulses, during the jump motion no discharge occurs. After this, the feed vector V(x, z, y, c) changes just slowly in the course of discharge machining. During a predetermined time duration T1 the discharge process is stabilized after the jump motion and then during a time duration T2 (preferably 100 to 2000) discharge pulses long, particularly preferred longer than the time duration T1) the characteristic values of a plurality of machining pulses are then sensed likewise with the extended pause times. The time duration T1 thus serves as a transient cycle to attain a stable condition of the spark gap. After the jump motion the spark gap is very clean so that after a few discharges (transient cycles) ideal conditions exist for optimum efficiency of the ideal conditions exist for optimum efficiency of the process. This is the ideal point in time for sensing the characteristic values of a plurality of machining pulses. A few "bad" machining pulses are discarded and the sensed characteristic values of the good pulses are saved as reference values. In the subsequent time interval in which no such detection is done these reference values are maintained substantially unchanged (at the most slightly adapted to changed discharge requirements).

The sensing phase commences preferably 50 to 200 ms after the jump motion (T1) and/or with the first discharge following a jump motion and lasts preferably 50 to 100 ms(T2). It can be implemented after every jump motion or less frequently, depending on the frequency of the jump motion and type of machining involved.

Where machining does not permit a jump motion the pulses are separated by longer pause times before and during sensing, as shown in FIG. 5. FIG. 5 likewise shows a feed V(x, z, y, c) of the machining electrode as a function of time for machining without a jump motion, FIG. 5 also showing at the bottom a train of discharge pulses resulting in the aforementioned feed V(x, z, y, c). The time durations T1 and T2 in this case are longer, since the gap takes longer to achieve an ideal conductivity; depending on the geometry of the machining electrode T1 may last a few seconds. T2 must be sufficiently long to sense 100 to 2000 pulses. The time T1 could be optimized by waiting until a conductivity of the gap has become smaller than the predetermined threshold value. The conductivity can be derived from sensing the voltage in the pause times $U_0$ (see for example CH 650 433, Vasiliev, Otto, Levit, 1981). During sensing the safety guards are disabled or at least diminished so as not to influence sensing.

Referring now to FIG. 6 there is illustrated an embodiment of a gap sensing module which resolves the pulse voltage for each machining pulse as sensed across the working gap into the following four characteristic values and saves them in the microcontroller (Contr.):

burning voltage $U_e$, high-frequency component of the burning voltage $U_e$, fall time $t_{bd}$ and pause voltage $U_0$.

This device also totalizes the number of discharges theoretically possible with a certain time interval and the number and duration of the actual discharges.

For this purpose the gap sensing module compares the pulse voltage 20 sensed and scaled over the working gap in three comparators 21, 22, 23 to the threshold voltage L1, L2 and L3 respectively. When the pulse voltage 20 drops below the L1 and L2 the comparators 21 and 22 generate the pulses 37 and 38 respectively. These pulses 37 and 38 activate an RS flip-flop 24 which generates a signal 26 representing the fall time $t_{bd}$. This signal 26 is supplied to the microcontroller 50 (Contr. In FIG. 1), an Infineon XC167 microcontroller being used, for example, for this purpose. The XC167 features various "compare" inputs with which the pulse width can be totalized in thus saving the time duration of the signal 26 in the controller 50. From the comparison with the threshold value L3 the comparator 23 furnishes a signal signalizing a discharge having occurred during the machining pulse. This signal is furnished together with a signal OCP to an AND gate 25. The signal OCP is high for the duration of the machining pulse and low during the pause duration. A high level of the output signal 32 at the AND gate 25 closes an analog switch 27 for the duration of the burning voltage $U_e$ it thereby connecting a low-pass filter 29 to the scaled pulse voltage. The low-pass filter 29 smooths the value of the signal 33 representing the burning voltage $U_e$ of the pulse and maintains this value stable therewith until its capture in the microcontroller 50.

The high level of the output signal 32 likewise closes the analog switch 28 in thus connecting a high-pass filter 30 to the scaled pulse voltage for passing the high-frequency component of the burning voltage $U_e$. Connected in series with the high-pass filter 30 is a low-pass filter 37 which in turn has the function of maintaining the value of the high-frequency component of the burning voltage, i.e. the signal 34 stable until its capture.

A signal OCPN complementary to signal OCP closes an analog switch 35 during the pause time which thus in this time interval furnishes the voltage sensed across the working gap to the controller 50, i.e. information as to the conductivity of the working gap. A low-pass filter 31 serves likewise to stabilize the signal 36 during capture thereof. During the pause time a weak (e.g. 20 V) weak voltage source involving a resistance is switched to the working gap, the voltage of which varies as a function of the conductivity of the gap. Since this method is prior art it is not detailed presently.

Each analog-digital converter contained in the controller 50 (for example, the XC167 features 16 analog-digital converters with 10 bit resolution and a conversion time of 2.85 μs) converts the corresponding stable maintained output signals 33, 34 and 36 into digital signals for further processing.

During the sensing phase the microcontroller 50 saves the relevant features of each machining pulse. The signal OCP and signal 32 are captured by the microcontroller 50 in real time and serve to totalize, on the one hand, the number of theoretically possible discharges in a certain time interval (signal OCP) and, the number and duration of discharges (signal 32) having actually occurred in this time interval. These signals OCP and 32 are counted by the corresponding counter contained in the controller 50.

A timing sensor GPT1 likewise contained in the controller 50 computes from the signal 32 the duration of the discharges, i.e. the duration of the pulse current, during which the voltage $U_e$ and the current $I_e$ is simultaneously applied to the spark gap, i.e. the power $u_e*i_e$ which as totalized with time equals the energy $u_e*i_e*t_e$, proportional to which is the material removal. Since $I_e$ (current source) and burning voltage $U_e$ (dictated by the material pairing) are constant, sensing the discharge duration permits estimating the material removal.

The discharge duration of each pulse, integrated to the number machining pulses, and multiplied by the coefficients resulting from the machining parameters gives the total material removal. The number of pulses per unit of time during the ideal condition (during the sensing phase) is further a criteria for the quality of the machining. If the number of discharges actually occurring in this time interval is too small, this is an indication as to very difficult machining conditions so that the gap width control cannot guarantee good efficiency of the process. this involves open and short circuits. In this case the microcontroller 50 will trigger a jump motion for example by the HW IPO module.

Comparing these values permits obtaining information important as to how efficient the process is. When machining with a negatively poled electrode and very short pulses (1 μs and less) as is usual in micromachining, the number of actual discharges in a time interval is a criteria of process efficiency. Sensing otherwise during the very short pulse duration is highly unreliable. The actual pulse frequency is also used with preference to trigger jump motions. Thus, the actual pulse frequency namely equals the number of discharges actually having occurred per unit of time, i.e. when the actual pulse frequency is lower than during the sensing phase less a safety value, the flush motion is likewise initiated.

As mentioned above, the correlations for example between wear and fall time $t_{bd}$ are not linear and averaging would filter out important information (see D.Dauw: "On-line identification and optimization of electro-discharge machining", thesis KUL Leuven, 1985; pages 3-48). Also non-linear is the correlation between the burning voltage $U_e$ and the risk of arcing, a drop in the burning voltage from 30 V to 29 V not meaning the same as a change in voltage from 24 V to 23 V; in the latter case the risk of arcing is very high, but not in the first.

So as not to filter out the non-linear correlations, the values saved at the end of the sensing phase are preferably classified by the method of statistical distribution, or expressed otherwise, the microcontroller 50 identifies the mostly occurring values as the reference value. The following Table illustrates a case, by way of example, in which of the 100 machining pulses applied, 83 resulted in a discharge, the sensed burning voltage $U_e$ values of which are distributed as listed:

|  | Burning voltage $U_e$ [V] | | | | | | | |
| --- | --- | --- | --- | --- | --- | --- | --- | --- |
|  | 19 | 20 | 21 | 22 | 23 | 24 | 25 | 26 |
| Number of pulses | 5 | 7 | 20 | 15 | 16 | 12 | 5 | 3 |

In this case the microcontroller 50 would select 21 V as the reference value for the burning voltage. Other statistical methods can be put to use in this case to identify outliers, on the one hand, and, on the other, the relevant properties of the pulse group. Preference is given to this method as compared to simple averaging because all values sensed have a non-linear characteristic.

Further features, such as the ignition delay time $t_d$, the pulse voltage, pulse current can be similarly extracted and saved.

The reference values as thus calculated can be adapted such that when, for example, the machining priority is minimizing electrode wear, the reference value of the burning voltage $U_e$ as established by the above method of statistical distribution is subsequently slightly reduced and the reference value of the fall time $t_{bd}$ slightly increased. On top of this, at the start of discharge machining the reference values can be adapted towards allowing for less optimum machining pulses since the process in this special case has poor efficiency and the probability of machining pulses less than an optimum is elevated. Once machining has settled down, the reference values can then be adapted stronger towards optimum machining pulses.

Referring now to FIG. 7 there is illustrated an embodiment of a comparator which compares the actual to the setpoint values (reference values) and masks degenerated pulses. The controller 50 outputs the reference values for the burning voltage 40 and for the high-frequency component 41 by means of two digital/analog converters (DAC) to two comparators. The comparators compare these setpoint values to the actual values 33 (burning voltage $U_e$, see FIG. 6) and 34 (high-frequency component see FIG. 6) and furnishes the output signals 42 and 43. For comparing the fall time $t_{bd}$ of the pulses the microcontroller 50 loads a binary counter 44 with the fall time setpoint value 51 from the controller 50 as calculated from the sensing phase. When the setpoint value is attained the binary counter 44 furnishes a transfer signal 49 which triggers a D-flip-flop 47, the input of which provides the fall time actual value 26 so that its output signal 45 (and the output signal 48 of a subsequent AND gate) indicates whether the pulse needs to be disabled because its current fall time deviates from the reference fall time. An OR gate 49 forms from the input signals 42, 43 and 48 an output signal 46 which is supplied to the generator control module (Gen Control) as shown in FIG. 1. This output signal 46 disables the machining pulse classified as degenerated directly on application in thus ensuring that electric discharge process is performed only with the efficient pulses.

The circuits as described above are to be understood as non-restricting examples. All digital circuits are preferably integrated in a single FPGA module and described by way of a suitable programming language, such as, for example, VHDL.

Where machining in which a jump motion is possible, this is triggered by the microcontroller 50 either in a fixed cycle and/or when the machining conditions deteriorate as signalized, among other things, by a low pause voltage $U_0$, in which case the microcontroller 50 makes use of the signal 31 by comparing it to the reference value for the conductivity. If the signal 31 is much too small, a jump motion is triggered, this also being the case when the actual pulse frequency is much lower than the corresponding reference value saved in the sensing phase or when the number and duration of the actual discharges (for example because of the masked pulses) is much lower than the corresponding reference values saved in the sensing phase.

When machining does not allow for a jump motion the microcontroller 50 disables the pulses by longish pauses during the sensing phase. Normally the pauses amount to 10 to 200% of pulse duration, depending on the electrode material, the material pairing, the machining conditions etc. concerned. In the cited case the pauses are extended as compared to "normal" pauses by the factor 2 to 4. Extending the pause should be sufficient for sensing 100 to 2000 machining pulses. For pulses having a pulse duration of 100 µs and a pause duration of 50 µs the sensing phase thus amounts to 100(or 2000)*(100+50 µs)=15(or 300) ms. Otherwise the method as described above can be put to use identically.

The sensing phases are cycled by the microcontroller 50, particularly in the following cases:
at regular intervals,
the pause voltage $U_0$ is too low,
the actual pulse frequency is much lower than the corresponding reference value saved in the sensing phase (similar as to the jump motion being triggered),
number and duration of the actual discharges are much lower than the corresponding reference values saved in the sensing phase.

In summary the advantages of this method are that the reference values in a given context always correspond to the best-possible machining conditions (as after a jump motion) requiring all pulses to approach such values. For example, when machining with a ribbed electrode, capturing the reference values after a jump motion is of particular advantage since in most cases discharges take place only at the front face of the electrode. These pulses feature a particularly high burning voltage $U_e$ since the electrode prompts a voltage drop across the full length. Pulses which discharge at the side faces of the electrode have a smaller burning voltage $U_e$, since their voltage drop is smaller. Thus when pulses discharging across the front face are taken as a model for subsequent machining, the lateral sparks can be eliminated to a major degree so that the lateral gap becomes very small. Thus the pump effect of the jump motions is maximized.

The invention claimed is:

1. A method for electrical discharge machining (EDM) a workpiece using a train of machining pulses wherein the machining pulses are applied to a working gap between the workpiece and an electrode during a machining time comprising:
dividing the machining time into a sensing interval during which reference values are captured from the machining pulses and into a machining interval during which no reference values are captured from the machining pulses, the sensing interval including at least one of a first sensing interval after implementation of a jump motion of the electrode in the working gap and a second sensing interval after application of an extended pause time to at least some of the machining pulses, the extended pause time being longer than a pause time of other ones of the machining pulses;
sensing an electrical parameter of a current machining pulse applied to the working gap;
deriving at least one characteristic value from the sensed electrical parameter;
comparing the at least one characteristic value to at least one of the reference values captured on the basis of at least one earlier machining pulse; and
initiating an action depending on a result of comparing the at least one characteristic value to the at least one of the reference values.

2. The method as set forth in claim 1, wherein the first sensing interval is started after at least one of a first predetermined waiting time (T1) and the first discharge of a machining pulse after implementing the jump motion for a first time duration (T2).

3. The method as set forth in claim 2, further comprising extending the pause time between the machining pulses during at least one of the first predetermined waiting time (T1) and the first time duration (T2).

4. The method as set forth in claim 1, wherein during the sensing interval, the characteristic values are captured and saved and values occurring most frequently in the sensing interval are used as reference values for the subsequent machining interval.

5. The method as set forth in claim 4, further comprising adapting the reference values to a machining requirement.

6. The method as set forth in claim 1, wherein the at least one characteristic value of the machining pulse includes at least one of a burning voltage ($U_e$), a high-frequency component of the burning voltage ($U_e$), a fall time ($t_{bd}$) from the idle voltage to the burning voltage ($U_e$), a pause voltage ($U_o$) and a number and duration of actually occurred discharges during a predetermined time interval.

7. The method as set forth in claim 1, wherein during the sensing interval, safety actions guarding against process degeneration are diminished or disabled.

8. The method as set forth in claim 1, wherein the second sensing interval is started after a second predetermined time duration (T2) after application of the machining pulses with the extended pause time for a second time duration (T2).

9. The method as set forth in claim 1, wherein during the sensing interval, the characteristic values of each machining pulse are derived and saved, and the reference values captured from the associated saved characteristic values are used substantially unchanged during a subsequent machining interval.

10. The method as set forth in claim 1, wherein the current machining pulse is instantly disabled when at least one characteristic value deviates from its corresponding reference value.

11. The method as set forth in claim 1, wherein a pause voltage ($U_o$), an actual pulse frequency or a number and duration of the discharges are captured as characteristic values and wherein a jump motion is implemented when a deviation from the associated reference value is sensed.

12. The method as set forth in claim 1, wherein a pause voltage ($U_o$), an actual pulse frequency or a number and duration of the discharges are captured as characteristic values and wherein the pause times between the machining pulses during a predetermined third time duration are extended when a deviation from the associated reference value is sensed.

13. A device for electrical discharge machining (EDM) a workpiece using a train of machining pulses, comprising:
- a machining pulse generator that:
    - applies the machining pulses to a working gap between the workpiece and an electrode during a machining time,
    - divides the machining time into a sensing interval during which reference values are captured from the machining pulses and into a machining interval during which no reference values are captured from the machining pulses, the sensing interval including at least one of a first sensing interval after implementation of a jump motion of the electrode in the working gap and a second sensing interval after application of an extended pause time to at least some of the machining pulses, the extended pause time being longer than a pause time of other ones of the machining pulses,
- senses an electrical parameter of a current machining pulse applied to the working gap,
- derives at least one characteristic value from the sensed electrical parameter,
- compares the at least one characteristic value to at least one of the reference values captured from at least one earlier machining pulse, and
- initiates an action depending on the result of the comparison between the at least one characteristic value and the at least one of the reference values.

* * * * *